United States Patent
Monteith

[19]

[11] Patent Number: 6,068,765

[45] Date of Patent: May 30, 2000

[54] SEPARATOR TANK

[75] Inventor: Joseph Gordon Monteith, Mississauga, Canada

[73] Assignee: Stormceptor Corporation, Ontario, Canada

[21] Appl. No.: 09/276,827

[22] Filed: Mar. 26, 1999

[51] Int. Cl.[7] .................................................. B01D 21/02

[52] U.S. Cl. .................... 210/170; 210/238; 210/254; 210/519; 210/521; 210/532.1; 210/538

[58] Field of Search .................................. 210/154, 170, 210/232, 237, 238, 254, 519, 532.1, 538, 521, 540

[56] References Cited

U.S. PATENT DOCUMENTS

| | | | |
|---|---|---|---|
| 942,907 | 12/1909 | Huff . | |
| 1,844,443 | 2/1932 | Schmidt . | |
| 3,221,881 | 12/1965 | Weiler et al. | 210/136 |
| 3,567,024 | 3/1971 | McCormick | 210/164 |
| 3,822,789 | 7/1974 | Crisafulli | 210/242 |
| 3,862,040 | 1/1975 | Preus et al. | 210/253 |
| 3,951,810 | 4/1976 | Crisafulli | 210/242 |
| 4,136,010 | 1/1979 | Pilié et al. | 210/164 |
| 4,298,471 | 11/1981 | Dunkers | 210/170 |
| 4,363,731 | 12/1982 | Filippi | 210/532.1 |
| 4,455,231 | 6/1984 | Filippi | 210/519 |
| 4,578,188 | 3/1986 | Cousino | 210/170 |
| 4,693,821 | 9/1987 | Goronszy et al. | 210/241 |
| 4,983,294 | 1/1991 | Lamb | 210/521 |
| 4,985,148 | 1/1991 | Monteith | 210/519 |
| 5,433,845 | 7/1995 | Greene et al. | 210/170 |
| 5,498,331 | 3/1996 | Monteith | 210/170 |
| 5,531,888 | 7/1996 | Geiger et al. | 210/162 |
| 5,560,826 | 10/1996 | Szereday et al. | 210/522 |
| 5,725,760 | 3/1998 | Monteith | 210/170 |
| 5,746,911 | 5/1998 | Pank | 210/170 |
| 5,746,912 | 5/1998 | Monteith | 210/170 |
| 5,753,115 | 5/1998 | Monteith | 210/170 |
| 5,759,415 | 6/1998 | Adams | 210/776 |
| 5,770,081 | 6/1998 | McKinney | 210/620 |
| 5,849,181 | 12/1998 | Monteith | 210/163 |
| 5,875,675 | 3/1999 | Yliknuussi et al. | 73/299 |
| 5,895,579 | 4/1999 | Schloss et al. | 210/767 |

FOREIGN PATENT DOCUMENTS 2180383   1/1998   Canada .

OTHER PUBLICATIONS

Merritt, Frederick S., Ed. *Standard Handbood for Civil Engineers*, Third Edition. McGraw–hill, Inc., New York: 1983. pp. 22–19 –22–21.

"Design and Construction of Urban Stormwater Management Systems," *ASCE Manuals and Reports of Engineering Practice*, No. 77, American Society of Civil Engineers, New York: 1992. pp. 403–413.

*Water Resources Engineering*, McGraw–Hill: 1964. pp. 537–539.

Marsalek, J. *Laboratory Testing of Stormceptor I*. National Water Research Institute, Ontario, Canada: May, 1993. pp. 1–50.

Marsalek, J., et al. *Laboratory Development of Stormceptor II*. National Water Research Institute, Ontario, Canada: Oct., 1994. pp. 24–50.

*Primary Examiner*—Christopher Upton
*Attorney, Agent, or Firm*—Baker Botts, L.L.P.

[57] ABSTRACT

A separator tank for rain water and waste-water treatment includes a container divided by a divider into an upper by-pass compartment and a lower treatment compartment. The divider includes a drop pipe assembly having a tapered cross-section. The drop pipe assembly includes a drop pipe having a T-shaped connection. For assembly, the drop pipe is lowered down through an opening in the divider and forms a friction fit with the opening. The drop pipe assembly also optionally includes an appropriately sized flow restricting plate positioned over the opening in the divider.

16 Claims, 10 Drawing Sheets

SEPARATOR TANK

INTRODUCTION

1. Field of the Invention

This invention relates generally to separator tanks. More specifically, this invention relates to separator tanks, including catch basins, having improved flow control configurations.

2. Background of the Invention

Separator tanks, sometimes called interceptors, are hydraulic structures adapted to receive rainwater and runoff from a storm sewer or drain, and additionally to separate and entrap any oil- or gasoline-based materials and suspended solids that may enter, allowing the water fraction to discharge into municipal receiving sewers or water courses. Conventional separator tanks of this kind are typically equipped with various baffles and chambers operating in such a way as to collect specific components of the waste fluid and separate them from others.

One type of conventional separator tank comprises a container having a bottom wall, a side wall and a top wall which together define an internal chamber. The container has an inlet through which the rainwater or runoff enters the separator tank and an outlet through which treated water exits the tank. A divider divides the chamber into a by-pass compartment above the divider and a treatment compartment below the divider. The divider includes a weir portion positioned between the inlet and the outlet, and first and second openings on opposite sides of the weir portion. The first and second openings provide liquid communication between the by-pass compartment and the treatment compartment. A first and second pipe are connected to the first and second openings respectively, and extend into the treatment compartment. The bottom end of each pipe is positioned at an intermediate level within the treatment compartment.

There are a number of different applications for such a separator tank. For example, separator tanks may be used:
- to treat runoff from commercial parking lots,
- for industrial spill control,
- to treat runoff from gas stations and other auto service facilities,
- to treat runoff from highways and other roads,
- for spill control and treatment of runoff from air, land and sea ports,
- to pretreat runoff going to infiltration and filtration systems, ponds and wetlands,
- to treat runoff from residential developments,
- in retrofit applications where land is not available for systems with large footprints (e.g., ponds),
- to treat runoff from small areas, such as loading docks, refueling pads, and transformer pits.

Regardless of the application, the above-described separator tank is generally designed to provide two distinct responses to two different operating conditions.

Under a low flow condition, rainwater or runoff entering the separator tank flows into the inlet and through the first opening and first pipe (hereinafter, "the drop pipe") into the treatment compartment. The rainwater or runoff entering the interceptor may include foreign materials in liquid or solid form. The foreign materials might consist of oil, fat or grease of animal, vegetable or mineral origin, gasoline, sediment, metal shavings and the like. These foreign materials are collected within the treatment compartment of the separator tank which is generally primed with clean water. The solids settle to the bottom of the treatment compartment and the floatables ascend to the top of the treatment compartment. The liquid at intermediate levels of the treatment compartment is relatively free of foreign materials.

As the low flow enters the separator tank, the weir portion enables a hydraulic head to build over the first opening. The hydraulic head forces liquid at the intermediate level of the treatment compartment into the second pipe (hereinafter, "the riser pipe"). Thus, the aqueous fraction of the runoff is forced up through the riser pipe and second opening and out of the outlet of the separator tank into a storm sewer or the like. The foreign materials including the liquid fraction made up of oil, fat or grease of animal, vegetable or mineral origin, gasoline, and the like, and the solids remain trapped within the separator tank and are typically pumped out at regular intervals.

The separator tank is also adapted to deal with inflow resulting from heavy rain during a storm. The high flow enters the separator tank through the inlet just as in the low flow condition. But, under high flow conditions, while some of the flow enters the treatment compartment through the first opening, because of the increased volume of the entering flow, the flow builds up behind and eventually overflows the weir portion and flows out the outlet, thus bypassing the treatment compartment.

Bypassing under high flow conditions helps ensure that the solids and floatables within the treatment compartment are not scoured or resuspended by a heavy flow. Moreover, bypassing under high flow condition is not generally detrimental to the environment because typically, rainstorms do not start as deluges and the separator tank does not immediately bypass. That is, most of the floatables and solids that are taken into a storm sewer system during a rainstorm are generally taken in during the beginning of the rain. During the beginning of a rainstorm, the flow into the separator tank gradually increases so that most of the entering runoff flows into the treatment compartment. By the time the flow into the separator tank reaches bypass levels, most of the floatables and solids are already in the treatment compartment.

In order for the separator tank to function properly, separation must be maintained within the treatment compartment. That is, the liquid at the intermediate level of the treatment compartment should remain relatively clean with the floatables on top and the solids on the bottom. To this end, flow into the tank is typically directed tangentially using a T configuration attached to the end of the drop pipe so that solids or floatables are not re-suspended and forced up the riser pipe and out of the separator tank.

A number of problems exist with this conventional design. In order for the separator tank to function properly, it should treat most, if not all, of the incoming flow under normal conditions and it should bypass under high flow conditions. But, exactly what constitutes normal conditions and what constitutes high flow conditions depends, upon the environment in which the separator tank is to be used, e.g. the impervious drainage area draining to the separator. Thus, use in different environments may require, at least, dividers with different sized openings and drop pipes. This is disadvantageous because it requires an inventory of numerous dividers with different pipe diameters.

Moreover, in order for proper flow to be maintained into and through the treatment compartment, the T configuration should be sized so that it does not restrict flow into the tank. The conventional design used a T configuration having a diameter that approximated the diameter of the first pipe. Because of this, the conventional design generally required a bottom-up assembly. That is, the first pipe is generally attached to the divider from below and therefore required a worker to be inside the tank during assembly. A dangerous condition.

SUMMARY OF THE INVENTION

Therefore, a need has arisen for a separator tank that overcomes the above-described problems.

It is one object of the present invention to provide a separator tank having a divider configuration having improved design flexibility and assembly safety.

According to one embodiment of the present invention a separator tank is disclosed. The separator tank comprises a tank having an inlet, an outlet and a divider dividing the tank into a treatment portion and a bypass portion. The divider comprises a first opening proximal to the inlet and enabling communication between the bypass portion and the treatment portion and a second opening proximal to the outlet and enabling communication between the treatment portion and the bypass portion. The divider also includes a weir disposed between the first opening and the second opening and operative to create a hydraulic head between the first opening and the second opening. An improved drop pipe is also included. The drop pipe has a first end and a second end. The first end of the drop pipe has a size and configuration suitable for forming a friction fit with the first opening. The second end of said drop pipe comprises a T-shaped or similar configuration sized to fit through the first opening.

According to another embodiment of the present invention a divider system for a separator tank is disclosed. The separator tank comprises a tank having an inlet and an outlet. The divider system divides the tank into a treatment portion and a bypass portion and provides communication therebetween. The divider system comprises a divider that divides the tank into the treatment portion and the bypass portion, a first opening, a second opening, and a weir. The first opening in the divider is proximal to the inlet of the tank and enables communication between the bypass portion and the treatment portion. The second opening in the divider is proximal to the outlet of the tank and enables communication between the treatment portion and the bypass portion. The weir is disposed between the first opening and the second opening and is operative to create a hydraulic head between the first opening and the second opening. A drop pipe assembly is advantageously included. The drop pipe assembly comprises a drop pipe, a T-shaped configuration and an orifice plate. The drop pipe has a first end and a second end. The first end of the drop pipe is sized for connection to said first opening. The second end of the drop pipe extends into the treatment portion. The T-shaped configuration is integral with the second end of the drop pipe and is sized to fit through said first opening. The orifice plate is sized to cover the first opening and has a central opening sized appropriately for the environmental conditions within which the separator tank will be used.

DETAILED DESCRIPTION OF THE PREFERRED EMBODIMENTS

Figure 1:
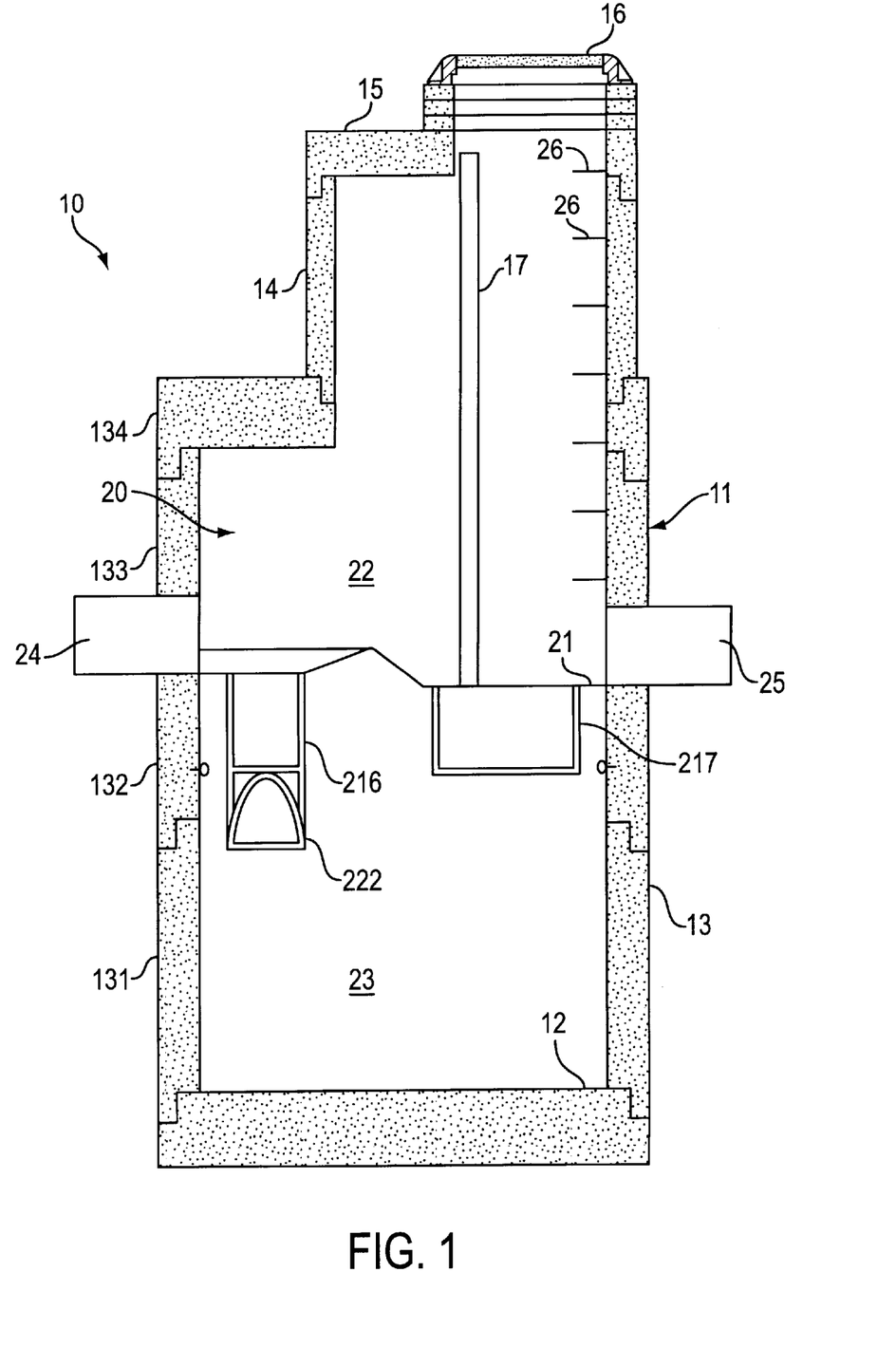
FIG. 1 is a side view of a separator tank according to one embodiment of the present invention.

Attention is first directed to FIG. 1, in which a separator tank is shown generally at the numeral 10. The separator tank 10 comprises a container 11 which has a circular bottom wall 12, a cylindrical side wall 13, a cylindrical grade adjuster 14, a substantially circular top wall 15, and manhole cover 16. The walls 12, 13 and 15 and the grade adjuster 14 define an internal chamber 20 which is divided, by a divider 21, into a by-pass compartment 22 above the divider 21, and a treatment compartment 23 below the divider 21.

Walls 13 define the volume of internal chamber 20 and are typically formed in sections. As can be seen in FIG. 1, side walls 13 are formed from sections 131, 132, 133 and 134. As such, the volume of internal chamber 20 can be adjusted by adding additional sections. Walls 12, 13 and 15 and grade adjuster 14 are typically formed from precast concrete as is known in the art. In an alternative embodiment, walls 12, 13 and 15 and grade adjuster 14 are made from fiberglass or thermoplastics.

Separator tank 10 also includes an inlet 24 through the side wall 13 adjacently above the upper surface of divider 21, the inlet 24 being adapted to permit liquid to flow into the by-pass compartment 22. At a peripheral location on the side wall 13, spaced away from the inlet 24, separator tank 10 includes an outlet 25 through the side wall 13 adjacently above the upper surface of divider 21, the outlet 25 being adapted to permit liquid to flow out of the by-pass compartment 22. Typically, the outlet 25 would be located slightly lower than the inlet 24, to provide a gradient that promotes flow through separator tank 10. While FIG. 1 shows the inlet and outlet to be approximately diametrically opposed, this is not essential. The inlet and outlet could be located anywhere on sidewall 13. Moreover, separator tank 10 could also include multiple inlets and outlets as needed due to the particular environmental conditions in which it is being used.

Figure 2:
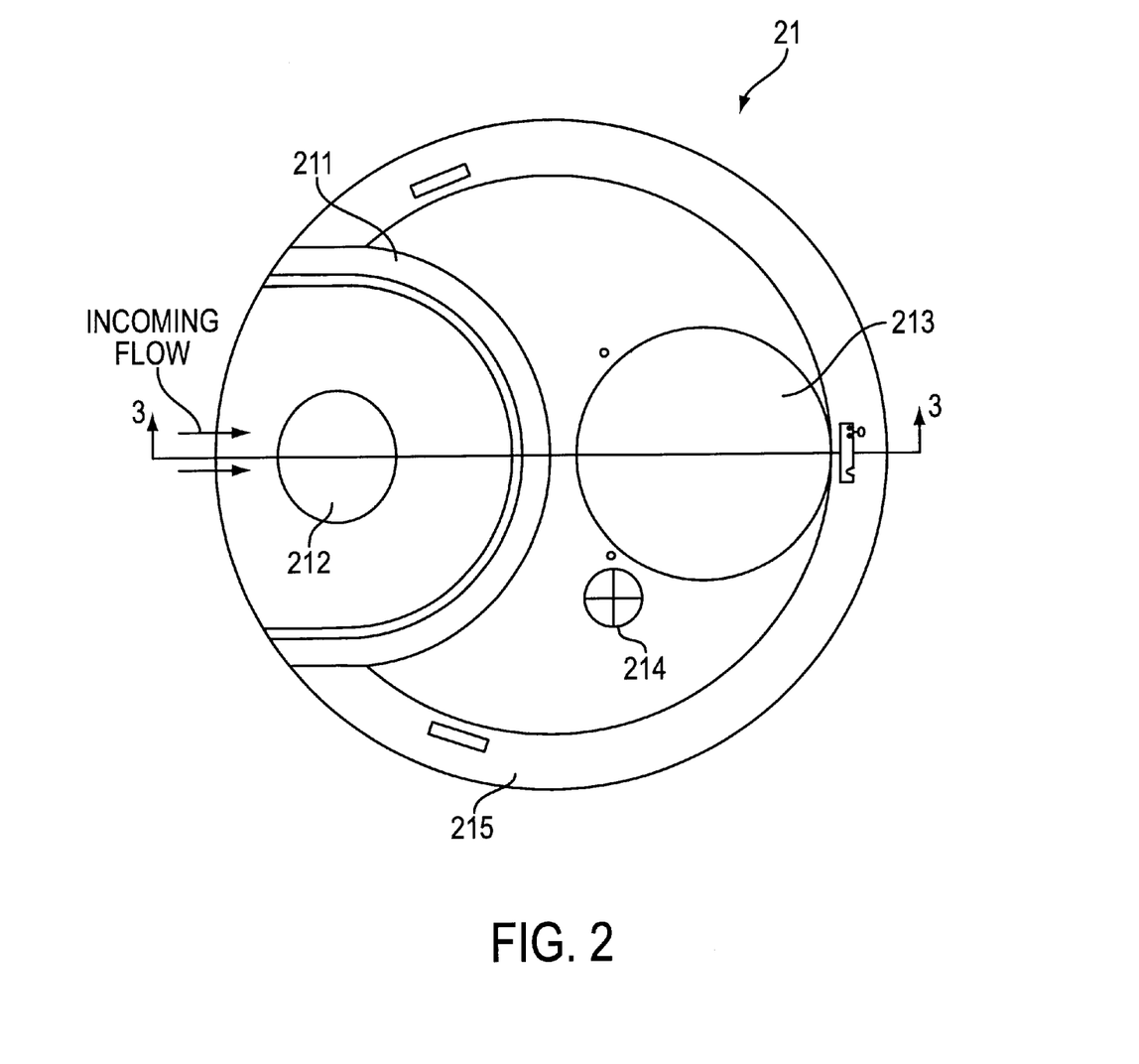
FIG. 2 shows a top view of a divider for a separator tank having a monolithic drop pipe according to one embodiment of the present invention.
Figure 3:
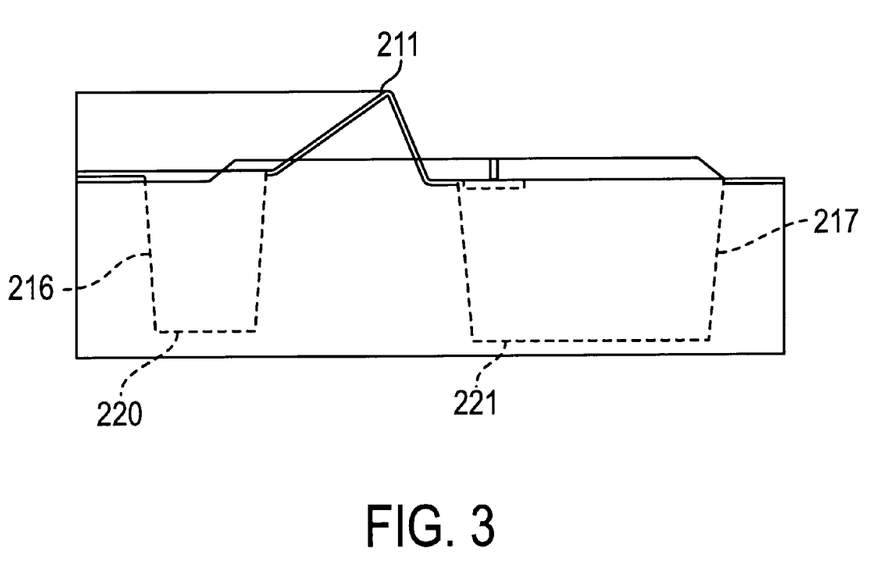
FIG. 3 shows a side view of a divider for a separator tank having a monolithic drop pipe according to one embodiment of the present invention.

FIGS. 2–3 depict top and side views of divider 21 according to the preferred embodiment of the present invention. According to one embodiment, divider 21 has a substantially circular outer perimeter which is sized to fit snugly within cylindrical side wall 13. Divider 21 includes a weir portion 211, a first opening 212, second opening 213, vent opening 214, gunnel 215, drop pipe portion 216 and riser pipe portion 217. Weir portion 211 is positioned between inlet 24 and first opening 212 on one side and outlet 25 and second opening 213 on the other side. Weir portion 211 enables liquid entering through the inlet 24 and seeking to reach the outlet 25 through by-pass compartment 22 to overflow weir portion 211 in order to do so. That is, the primary flow pattern under high flow conditions.

Openings 212 and 213 open to drop pipe portion 216 and riser pipe portion 217, respectively, that extend into the treatment compartment. It will be understood that the openings 212 and 213 and the corresponding pipe portions are configured such that liquid, without having to overflow weir portion 211, can travel from inlet 24 to outlet 25 by passing through first opening 212 and the drop pipe, thence into treatment compartment 23, thence through treatment compartment 23 to the bottom of the riser pipe, thence upwardly through second opening 213, thence to outlet 25 for discharge. That is, the primary flow pattern under low flow conditions. Weir portion 211 enables a hydraulic head to develop over opening 212 and facilitates this flow pattern.

According to this embodiment, second opening 213 has an internal diameter large enough to facilitate maintenance or allow passage of a maintenance worker from by-pass compartment 22 into treatment compartment 23. Conventionally, the first opening (i.e., the opening on the inlet side of weir portion 211) has a variable opening size to accommodate different average flow-rates for different treatment compartment sizes. This is problematic in that it requires a number of different dividers to be made having a number of different size drop pipes.

Therefore, according to the embodiments of the present invention, first opening 212 has a consistent opening size regardless of the average flow rate or treatment compartment size. As seen in FIG. 2, first opening 212 has a slightly oblong shape with a major axis perpendicular to the direction of incoming flow and a minor axis parallel to the direction of incoming flow. Other shapes are possible for first opening 212.

Figure 4A:
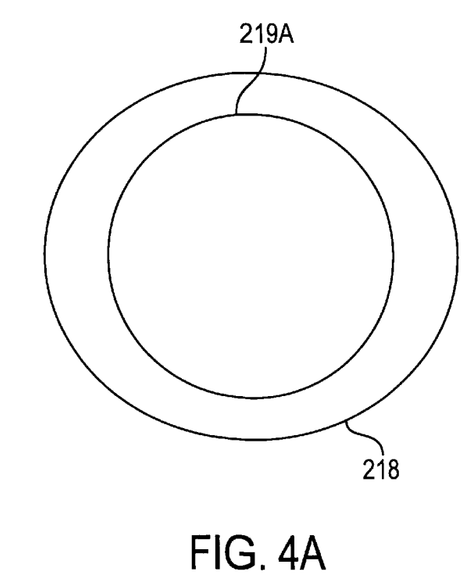
FIGS. 4a–4c show top views of orifice plates according to one embodiment of the present invention.
Figure 4B:
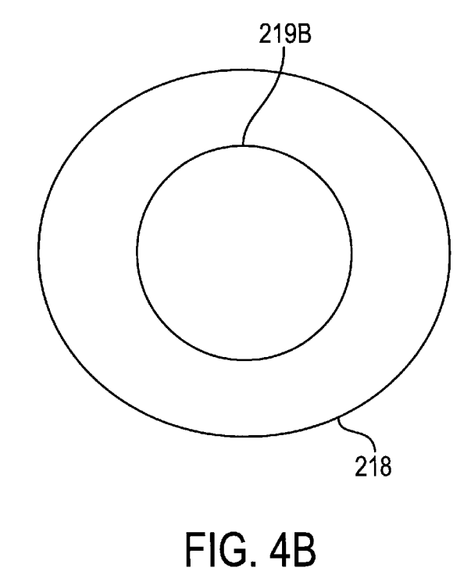
Figure 4C:
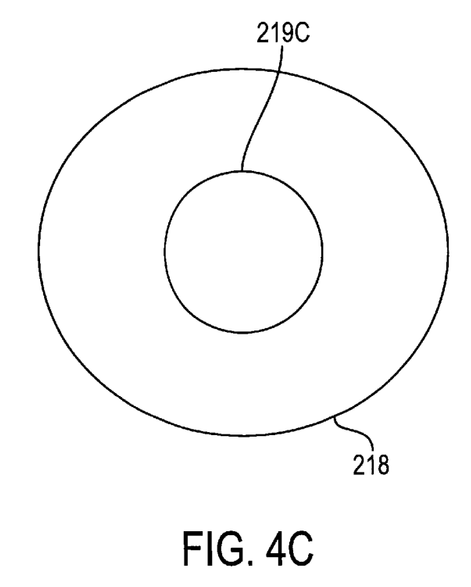

In order to avoid having to manufacture and stock a number of different dividers having different size first openings, first opening 212 is sized so that it can be used for environments having the maximum flow rate for which separator tank 10 is designed. Moreover, divider 21 is configured so that it may be used in environments having lesser flow rates as well. That is, divider 21 is configured so that an orifice plate may be used over first opening 21. FIGS. 4a–4c depict top views of three examples of orifice plates 218. Orifice plates 218 have the same shape as first opening 212 and have outside diameters (along both the major and minor axes) that are slightly smaller than the inside diameters (along both the major and minor axes) of first opening 212. Thus orifice plates 218 may be placed within first opening 212 and form a friction fit within first opening 212. Orifice plates 218 have inside orifices 219a, 219b and 219c that are sized appropriately for the environment in which the separator tank is to be used. According to one embodiment of separator tank 10, first opening 212 has major and minor axes of 14" and 12.5" respectively and can accomodate orifice plates having inside orifices of 6", 8" or 10". Alternatively, separator tank 10 can be used without an orifice plate.

As previously explained, the drop pipe extending into the treatment compartment preferably terminates at a T-connection to avoid re-suspension of floatables and solids within the treatment compartment. Nevertheless, the configuration of past drop pipes and T-connections required a bottom-up assembly that was potentially hazardous. According to the present invention, divider 21 includes an improved drop pipe and T-connection configuration. As shown in FIG. 3, divider 21 includes drop pipe portion 216. Drop pipe portion 216 is preferably slightly tapered, having maximum diameters (along both the major and minor axes) at first opening 212 and having minimum diameters at end 220 that extends into treatment compartment 23.

Figure 5A:
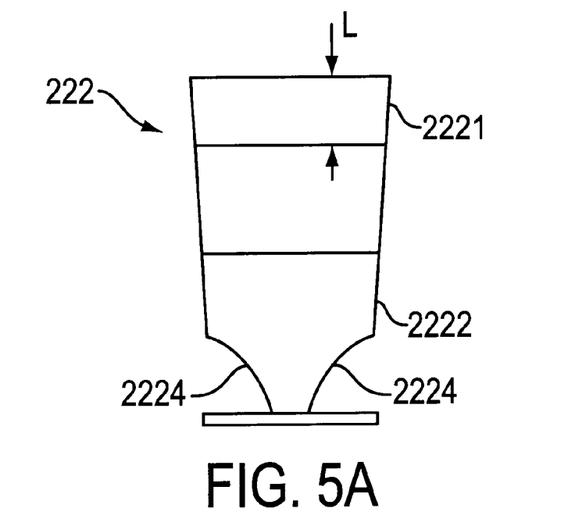
FIGS. 5a and 5b show front and side views of a T-shaped connection according to one embodiment of the present invention suited for some environmental conditions.
Figure 5B:
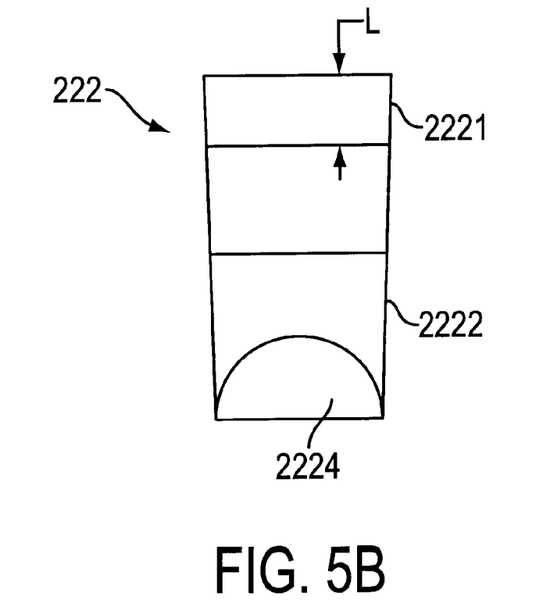

In order to avoid bottom-up assembly, a T-shaped connection 222 is provided. T-shaped connection 222 is configured from a tapered pipe portion having a solid bottom and openings along the sides. As shown in FIGS. 5a and 5b, the T-shaped connection 222 comprises overlap portion 2221, and T-portion 2222. Overlap portion has the same shape as end 220 of drop pipe portion 216 and has outside diameters (along both the major and minor axes) that are slightly larger than the inside diameters (along both the major and minor axes) of end 220. Thus, T-shaped connection 222 can be dropped down into drop pipe portion 216 from the bypass compartment side of divider 21. When this is done, overlap portion 2221 forms a friction fit with end 220 of drop pipe portion 216. According to one embodiment, the overlap portion has a length, L, of between 4"–6". Other overlap lengths are possible. The oval shape enables easy alignment with opening 212 and helps ensure that openings 2224 are properly oriented.

T-portion 2222 includes cut-outs on opposite sides to form openings 2224. FIG. 5a is a front view of T-shaped connection 222 and FIG. 5b is a side view of T-shaped connection 222. One of the openings 2224 of T-portion 2222 can be seen in FIG. 5b.

Figure 6A:
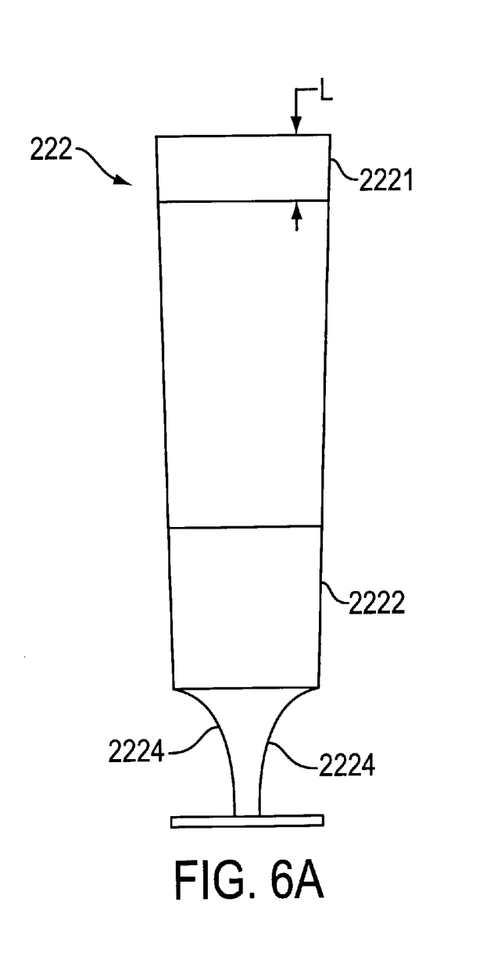
FIGS. 6a and 6b show front and side views of a drop pipe extension with T-shaped connection according to one embodiment of the present invention suited for other environmental conditions.
Figure 6B:
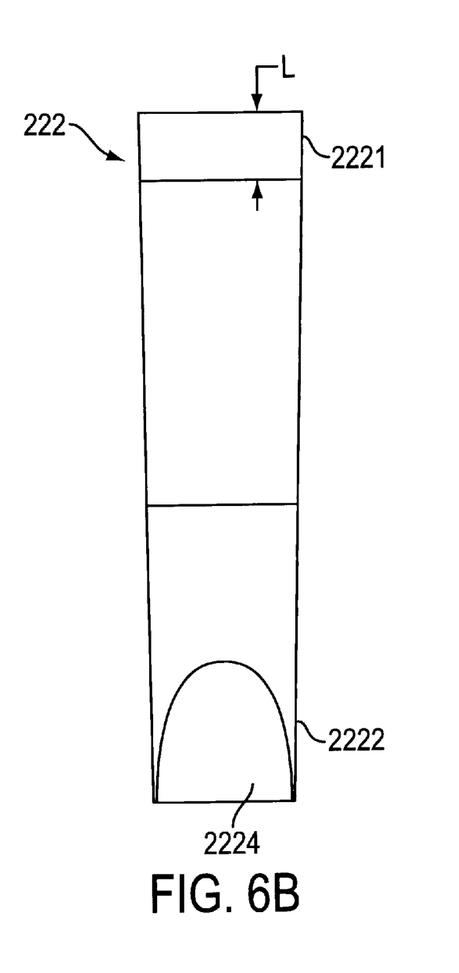

For some applications, the T-connection shown in FIGS. 5a and 5b will extend to a sufficient depth within treatment compartment 23. Nevertheless, for some environments a larger treatment compartment is necessary. In these environments, the same divider may be used. But treatment compartment 23 is given an increased capacity by flaring out the walls of treatment compartment 23 below the divider (i.e., increasing the diameter of treatment compartment 23) or by making treatment compartment 23 deeper. In these environments, an extended T-connection is used. FIGS. 6a and 6b show an extended T-connection. Like parts are labeled with like numerals in FIG. 6. The extended T-connection helps ensure that incoming flow does not disturb the floatables within treatment compartment 23.

Figure 7:
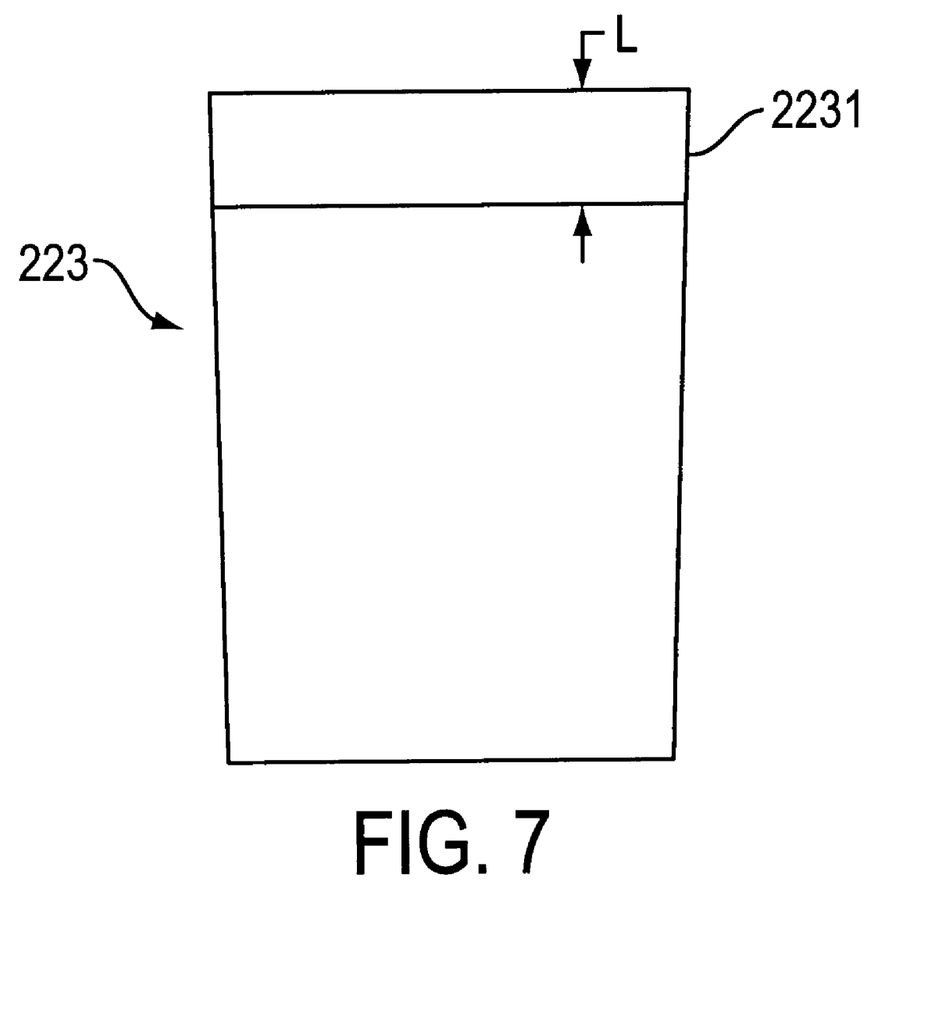
FIG. 7 shows a riser pipe extension according to one embodiment of the present invention.

Likewise, for some applications, riser pipe portion 217 will extend to a sufficient depth within treatment compartment 23. Nevertheless, for environments in which a larger treatment compartment 23 is necessary, riser pipe portion 217 also is tapered having a maximum diameter (assuming a circular cross-section) at opening 213 and having a minimum diameter at end 221 that extends into treatment compartment 23. As shown in FIG. 7, an extension 223 can thus be used to enable use in a larger treatment compartment. Extension 223 includes overlap portion 2231. Overlap potion 2231 has the same shape as end 221 of riser pipe portion 217 and has an outside diameter (assuming a circular cross-section) that is slightly larger than the inside diameter of end 221. Thus, extension 223 can be dropped down into riser pipe portion 217 from the bypass compartment side of divider 21. When this is done, overlap portion 2231 forms a friction fit with end 221 of riser pipe portion 217. According to one embodiment, the overlap portion has a length, L, of between 4"–6". Other overlap lengths are possible.

Returning to FIG. 1, it will be seen that top wall 15 of container 11 provides an access opening 16 which is offset with respect to the axis of the circular top wall 15, such that it approximately overlies the position of opening 213. A cover is provided to close the access opening 16. By generally aligning the opening 16 with the opening 213, it is possible to carry out inspection, sampling and the pumping out of the entire contents of treatment compartment 23 from a position above access opening 16, thus making it unnecessary, at least for a large number of maintenance tasks, for a worker to actually enter container 11. Nevertheless, to facilitate the work of personnel that do need to enter the containers for cleaning and other purposes, ladder rungs 26 are anchored into cylindrical side wall 13 and grade adjuster 14.

Also shown in FIG. 1 is a vent pipe 19, which rises within bypass compartment 22 of container 11. According to one embodiment, vent pipe 19 doubles as an oil removal port.

Figure 8:
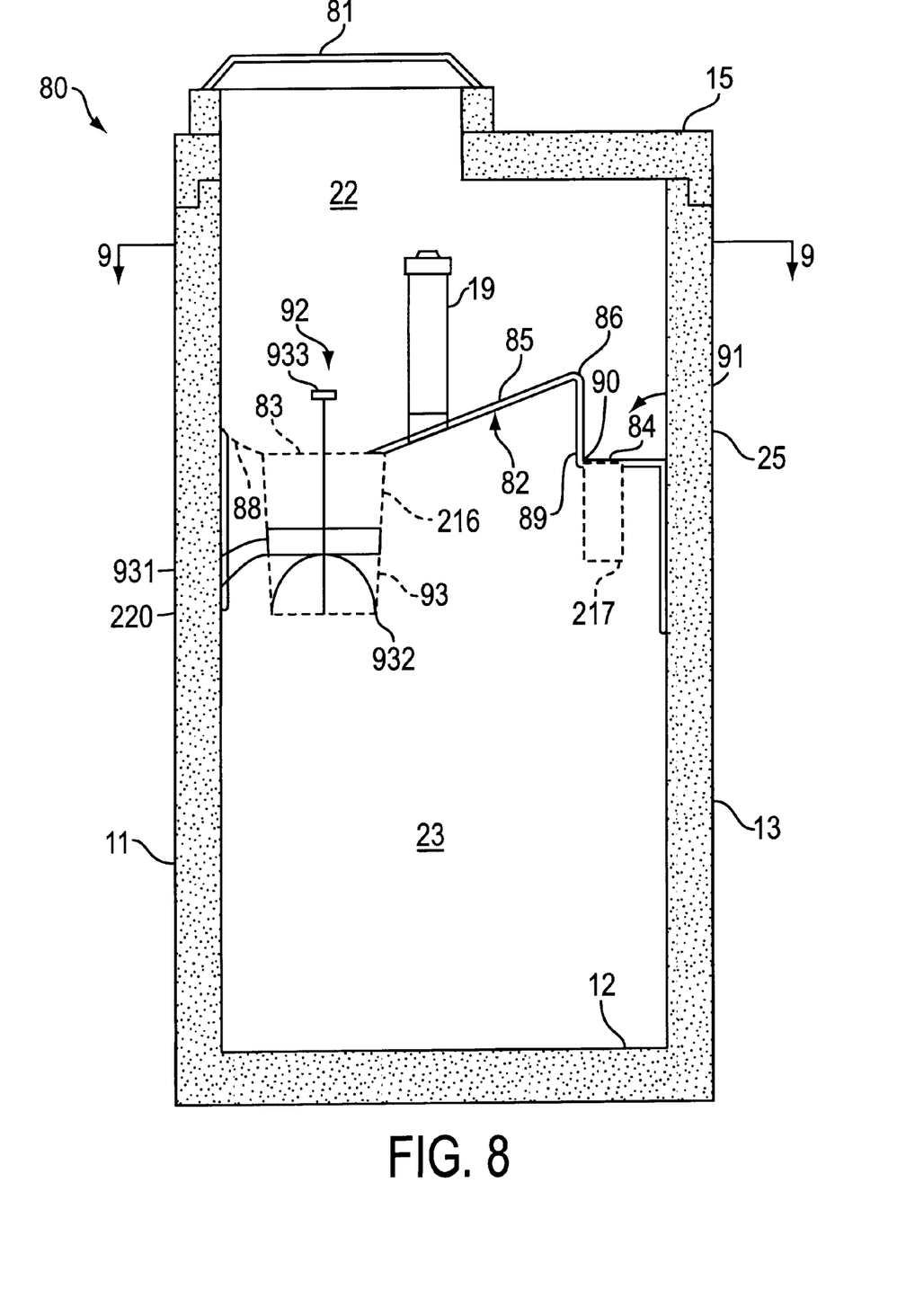
FIG. 8 shows a side view of a catch basin separator tank according to one embodiment of the present invention.
Figure 9:
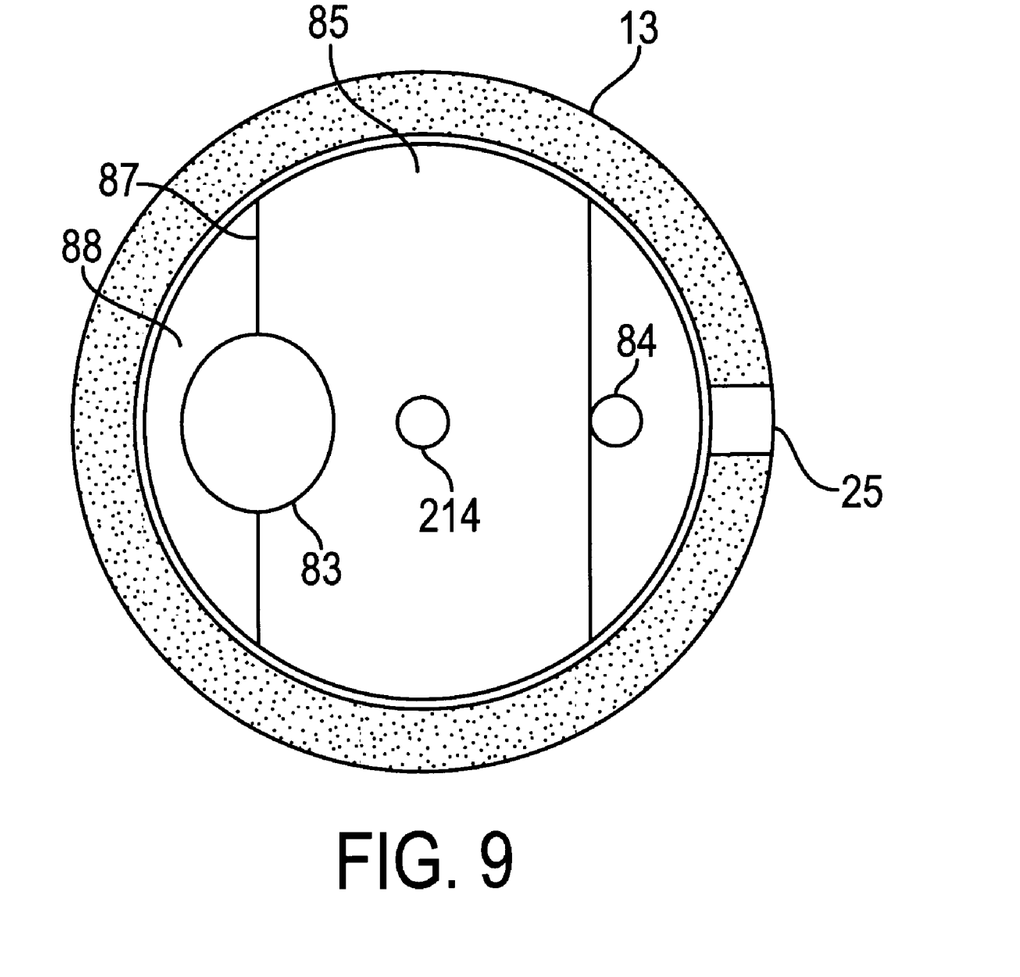
FIG. 9 shows a top view of a catch basin separator tank according to one embodiment of the present invention.

A second embodiment of the present invention will be explained in conjunction with FIGS. 8 and 9. FIGS. 8 and 9 show a catch basin type separator tank. This second embodiment of separtor tank differs from the embodiment shown in FIG. 1 primarily in that the inlet to the tank is on the top of the tank as opposed to through the side wall of the tank. This change in inlet locations necessitates a slight change in the configuration of the divider aa well. According to another embodiment, catch basin interceptor has its inlet in the side of the tank. The primary functions of the catch basin type of interceptor shown in FIGS. 8 and 9 under low flow and high flow conditions are the same as those of separator tank 10 shown in FIG. 1. Therefore, the explanation of FIGS. 8 and 9 will focus on the differences.

FIG. 8 shows a side view of one embodiment of catch basin interceptor 80. Catch basin interceptor 80 has an inlet 81 in top wall 15. In one embodiment, inlet 81 is an open grate. The grate is typically of cast iron. It is noted that inlet 81 is eccentrically located with respect to the circular top wall 15, and that it is located over first opening 83 of divider 82. Divider 82 has a substantially circular outer perimeter which is sized to fit snugly within the cylindrical side wall 13.

Divider 82 has its mid-region shaped to define an obliquely inclined sloping ramp 85 extending leftwardly and downwardly from a substantially horizontal upper edge 86 to an edge 87. Divider also includes an edge-region shaped to define an obliquely inclined sloping ramp 88 extending rightwardly and downwardly from side wall 13 and meeting ramp 85 at edge 87. A substantially vertical wall 89, rectangular in configuration, extends downwardly from the upper edge 86 to a lower edge 90 defining a rectilinear internal limit of an outlet region 91 having the shape of a circular segment. Outlet or second opening 84 is located substantially centrally of the outlet region 91. Outlet opening 84 constitutes the upper end of riser pipe portion 217 which extends substantially vertically downward into treatment compartment 23.

Divider 82 further defines an intake region 92 which is disposed diametrically opposite the outlet region 91, and which likewise has the form of a circular segment. Intake or first opening 83 is located substantially centrally within intake region 92. Intake opening 83 constitutes the upper end of drop pipe portion 216 which extends substantially vertically downward into treatment compartment 23. It will be noted that the outlet region 91 has a slightly lower vertical position than does intake region 92. This difference in height will tend to promote outflow through the riser pipe portion 217 and outlet 25.

As previously explained, the drop pipe extending into the treatment compartment preferably terminates at a T-connection to avoid re-suspension of floatables and solids within the treatment compartment. According to this second embodiment of the present invention, interceptor 80 includes an improved drop pipe having a T-connection configured somewhat like a basket. As described in the first embodiment, drop pipe portion 216 is preferably slightly tapered, having maximum diameters (along both the major and minor axes) at first opening 83 and having minimum diameters at end 220 that extends into treatment compartment 23.

Catch basin interceptor 80 is also provided with T-shaped connection 93. According to this embodiment, T-shaped connection 93 is configured similar to that shown in FIG. 1. That is, T-shaped connection 93 is configured from a tapered pipe portion having a solid bottom and openings along the sides. T-shaped connection 93 comprises overlap portion 931, T-portion 932, and handle 933. Overlap portion 931 has the same shape as end 220 of drop pipe portion 216 and has outside diameters (along both the major and minor axes) that are slightly larger than the inside diameters (along both the major and minor axes) of end 220. Thus, T-shaped connection 93 can be dropped down into drop pipe portion 216 from the bypass compartment side of divider 82. When this is done, overlap portion 931 forms a friction fit with end 220 of drop pipe portion 216. According to one embodiment, the overlap portion has a length, L, of between 4"–6". Other overlap lengths are possible.

T-shaped connection 93 is provided with a handle 933 that enables T-shaped connection 93 to be lifted out to allow cleaning and maintenance of treatment compartment 23. In an another embodiment, T-shaped connection 93 does not have a handle.

Figure 10A:
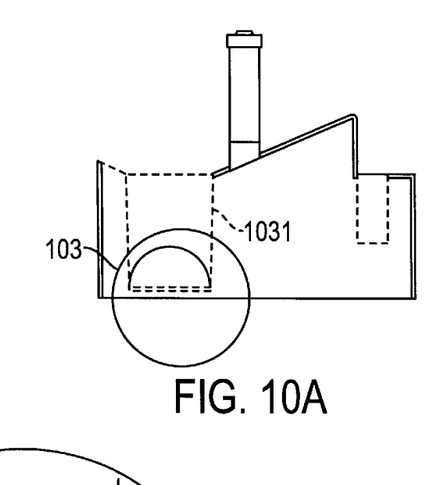
FIGS. 10a–10c depict a modified T-connection according to another embodiment of the present invention.
Figure 10B:
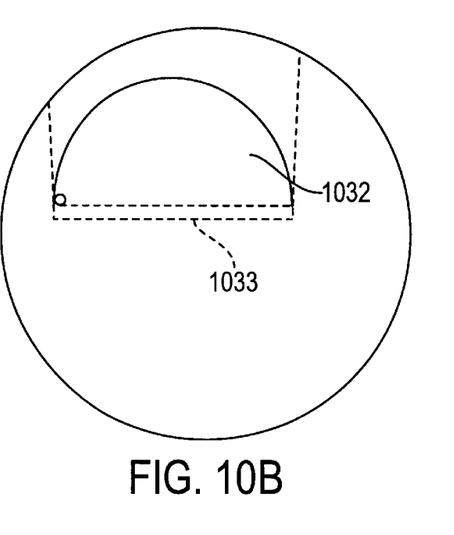
Figure 10C:
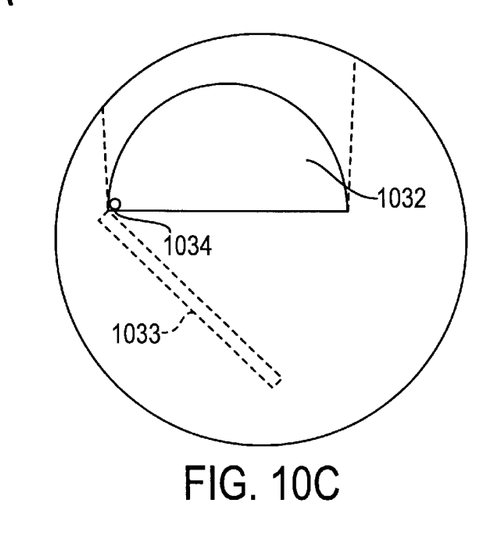

In an alternative embodiment, a modified T-connection may be used in place of the T-connection of either the first or second embodiment. FIGS. 10a–10c depict a modified T-connection 103. Modified T-connection 103 comprises tapered pipe portion 1031, openings 1032, floating plate 1033 and hinge 1034. During normal operation of the separator tank floating plate 1033 is closed and modified T-connection operates to divert incoming flow tangentially around the treatment compartment. This condition is shown in FIG. 10b. If trash builds up within the drop pipe, or if the treatment chamber needs to be cleaned out, hinge 1034 enables floating plate 1033 to open to allow the trash to enter the treatment compartment or to allow a hose to pass into the treatment compartment for cleaning purposes. This condition is shown in FIG. 10c. Assembly of modified T-connection 93 is similar to that shown in FIG. 1.

According to both of the embodiments depicted above, the dividers are shown as inserts that are placed into the tank. These inserts are typically made of fiberglass or similar material. Other divider constructions and materials are possible.

While embodiments of this invention have been illustrated in the accompanying drawings and described hereinabove, it will be evident to those skilled in the art that changes and modifications may be made therein, without departing from the essence of this invention, as set forth in the appended claims.

I claim:

1. A separator tank comprising:
   a tank having an inlet and an outlet;
   a divider dividing the tank into a treatment portion and a bypass portion, the divider comprising:
      a first opening proximal to the inlet and enabling communication between the bypass portion and the treatment portion;
      a second opening proximal to the outlet and enabling communication between the treatment portion and the bypass portion; and, a weir disposed between the first opening and the second opening and operative to create a hydraulic head between the first opening and the second opening; and, a drop pipe having a first end and a second end, the first end of the drop pipe having a size and configuration for forming a friction fit with said first opening, the second end of said drop pipe comprising a T-shaped configuration, the T-shaped configuration being sized to fit through said first opening.

2. The separator tank of claim 1 wherein the first opening is oval.

3. The separator tank of claim 1 wherein the drop pipe further comprises an elongated tapered portion extending between the first end and the second end.

4. The separator tank of claim 1 wherein the drop pipe is removable.

5. The separator tank of claim 4 wherein the second end of the drop pipe further comprises a handle connected to a bottom of the T-shaped configuration, said handle enabling the drop pipe to be removed from the bypass side of the divider.

6. The separator tank of claim 1 wherein the inlet is located in a top wall of the tank.

7. The separator tank of claim 1 wherein the inlet is located in a side wall of the tank.

8. The separator tank of claim 1 further comprising a drop pipe portion integral with the first opening of the divider and having a distal end, wherein the first end of the drop pipe has a size and configuration suitable for forming a friction fit with said distal end of said drop pipe portion.

9. The separator tank of claim 1 further comprising a riser pipe portion integral with the second opening of the divider.

10. The separator tank of claim 1 further comprising a riser pipe having a first end and a second end, the first end of the riser pipe sized for connection to said second opening, the second end of said riser pipe being sized to fit through said second opening.

11. A divider system for a separator tank, the separator tank comprising a tank having an inlet and an outlet, the divider system dividing the tank into a treatment portion and a bypass portion and providing communication therebetween, the divider system comprising:

a divider that divides the tank into the treatment portion and the bypass portion;

a first opening in the divider proximal to the inlet of the tank and enabling communication between the bypass portion and the treatment portion;

a second opening in the divider proximal to the outlet of the tank and enabling communication between the treatment portion and the bypass portion; and a weir disposed between the first opening and the second opening and operative to create a hydraulic head between the first opening and the second opening;

a drop pipe assembly comprising:

a drop pipe having a first end and a second end, the first end of the drop pipe sized for connection to said first opening, the second end of said drop pipe extending into the treatment portion;

a T-shaped configuration integral with the second end of the drop pipe, the T-shaped configuration being sized to fit through said first opening; and, an orifice plate sized to cover said first opening, the orifice plate having a central opening sized appropriately for the environmental conditions within which the separator tank will be used.

12. The divider system of claim 11 wherein the first opening is oval.

13. The divider system of claim 11, further comprising a drop pipe portion integral with the first opening of the divider and having a distal end, wherein the first end of the drop pipe is sized for connection to said distal end of said drop pipe portion.

14. The separator tank of claim 11 further comprising a riser pipe portion integral with the second opening of the divider.

15. The divider system of claim 11 wherein the drop pipe further comprises an elongated tapered portion extending between the first end and the second end.

16. The divider system of claim 11 further comprising a riser pipe having a first end and a second end, the first end of the riser pipe sized for connection to said second opening, the second end of said riser pipe being sized to fit through said second opening.

* * * * *